US012613388B2

(12) United States Patent
Sato et al.

(10) Patent No.: US 12,613,388 B2
(45) Date of Patent: Apr. 28, 2026

(54) SLOT TYPE OPTICAL FIBER CABLE

(71) Applicant: SUMITOMO ELECTRIC INDUSTRIES, LTD., Osaka (JP)

(72) Inventors: Fumiaki Sato, Osaka (JP); Eimi Kasai, Osaka (JP); Kenta Tsuchiya, Osaka (JP); Yuuki Shimoda, Osaka (JP); Takao Hirama, Osaka (JP); Satomi Ido, Osaka (JP); Kentaro Takeda, Osaka (JP); Hitoshi Tsubakiyama, Osaka (JP); Ken Takahashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 332 days.

(21) Appl. No.: 18/576,263

(22) PCT Filed: Jul. 6, 2022

(86) PCT No.: PCT/JP2022/026825
§ 371 (c)(1),
(2) Date: Jan. 3, 2024

(87) PCT Pub. No.: WO2023/282284
PCT Pub. Date: Jan. 12, 2023

(65) Prior Publication Data
US 2024/0241334 A1 Jul. 18, 2024

(30) Foreign Application Priority Data

Jul. 7, 2021 (JP) ................................. 2021-113014
Sep. 13, 2021 (JP) ................................. 2021-148801

(51) Int. Cl.
*G02B 6/44* (2006.01)

(52) U.S. Cl.
CPC ......... *G02B 6/4434* (2013.01); *G02B 6/4407* (2013.01)

(58) Field of Classification Search
CPC ... G02B 6/4434; G02B 6/4407; G02B 6/4436
USPC ........................ 385/100, 103, 105, 106, 109
See application file for complete search history.

(56) References Cited

U.S. PATENT DOCUMENTS

| | | | | |
|---|---|---|---|---|
| 4,772,089 | A * | 9/1988 | Ide ...................... | G02B 6/4429 |
| | | | | 385/113 |
| 10,416,403 | B2 * | 9/2019 | Okada .................. | G02B 6/4413 |
| 10,983,294 | B2 * | 4/2021 | Stover .................. | G02B 6/4434 |
| 2006/0159407 | A1 | 7/2006 | Kachmar | |

(Continued)

FOREIGN PATENT DOCUMENTS

| | | |
|---|---|---|
| EP | 0 996 016 A2 | 4/2000 |
| JP | H09-243886 A | 9/1997 |

(Continued)

OTHER PUBLICATIONS

International Search Report dated Aug. 9, 2022 issued in PCT/JP2022/026825.
Written Opinion dated Aug. 9, 2022 issued in PCT/JP2022/026825.

*Primary Examiner* — Robert Tavlykaev
(74) *Attorney, Agent, or Firm* — McDonald Hopkins LLC

(57) ABSTRACT

A slot type optical fiber cable includes a slot rod including a plurality of ribs for forming a plurality of slot grooves, and a plurality of optical fibers accommodated in the slot grooves. The number of the slot grooves is three or four.

14 Claims, 4 Drawing Sheets

(56)        References Cited

U.S. PATENT DOCUMENTS

| | | | |
|---|---|---|---|
| 2011/0110635 A1* | 5/2011 | Toge ..................... | G02B 6/441 |
| | | | 385/102 |
| 2017/0115451 A1* | 4/2017 | Sajima ................. | G02B 6/4432 |
| 2018/0321453 A1* | 11/2018 | Sato ..................... | G02B 6/4407 |
| 2020/0041741 A1* | 2/2020 | Takeda ................. | G02B 6/4408 |
| 2020/0150367 A1 | 5/2020 | Scarpaci et al. | |
| 2020/0183111 A1* | 6/2020 | Sato ..................... | G02B 6/4403 |
| 2020/0219638 A1* | 7/2020 | Williams .............. | H01B 7/425 |
| 2022/0252809 A1 | 8/2022 | Sato et al. | |

FOREIGN PATENT DOCUMENTS

| | | | | |
|---|---|---|---|---|
| JP | 2010-191085 A | 9/2010 | | |
| JP | 2012-185259 A | 9/2012 | | |
| JP | 2015-099315 A | 5/2015 | | |
| JP | 2016-075815 A | 5/2016 | | |
| JP | 2017-201358 A | 11/2017 | | |
| JP | 2020-60610 A * | 4/2020 | .............. | G02B 6/44 |
| JP | 2020-204687 A | 12/2020 | | |

* cited by examiner

SLOT TYPE OPTICAL FIBER CABLE

TECHNICAL FIELD

The present disclosure relates to a slot type optical fiber cable.

The present application claims priority based on a Japanese Application No. 2021-113014 filed on Jul. 7, 2021 and a Japanese Application No. 2021-148801 filed on Sep. 13, 2021, and incorporates all the contents described in the Japanese Applications.

BACKGROUND ART

Patent Literature 1 discloses a slot type optical fiber cable having six slot grooves.

CITATION LIST

Patent Literature

Patent Literature 1: JP2020-204687A

SUMMARY OF INVENTION

A slot type optical fiber cable according to one aspect of the present disclosure includes:
  a slot rod including a plurality of ribs for forming a plurality of slot grooves; and
  a plurality of optical fibers accommodated in the slot grooves,
  in which the number of the slot grooves is three or four.

BRIEF DESCRIPTION OF DRAWINGS

FIG. 4 is a cross-sectional view of a slot type optical fiber cable according to a third embodiment.

DESCRIPTION OF EMBODIMENTS

Technical Problem

Figure 1:
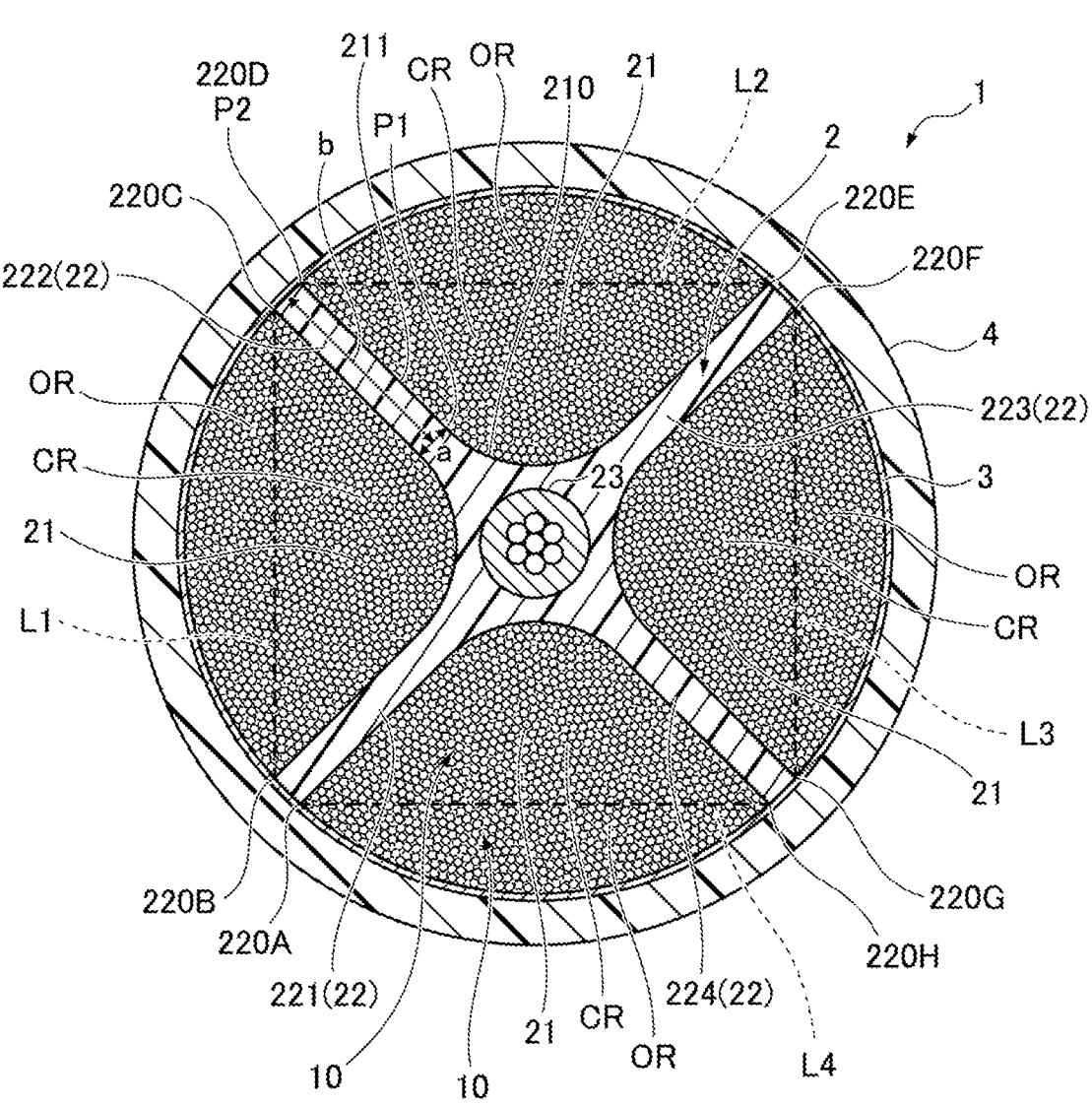
FIG. 1 is a cross-sectional view of a slot type optical fiber cable according to a first embodiment.

A slot type optical fiber cable according to Patent Literature 1 includes a slot rod (also referred to as a spacer) in which six slot grooves are formed, and the slot groove is divided by ribs. The ribs are usually arranged uniformly in a circumferential direction in a cross-sectional view, and thus bending anisotropy (presence or absence of a bending tendency) is less likely to occur. However, it is difficult to improve a mounting density of an optical fiber due to the presence of the rib. When the optical fiber is mounted at a high density, the number of optical fibers accommodated per one slot groove increases, and thus the identity of the optical fiber may decrease.

An object of the present disclosure is to provide a slot type optical fiber cable having high identity and allowing optical fibers to be mounted at a high density while bending anisotropy is reduced.

DESCRIPTION OF EMBODIMENTS

First, embodiments of the present disclosure will be listed and described.

A slot type optical fiber cable according to one aspect of the present disclosure includes:

(1) a slot rod including a plurality of ribs for forming a plurality of slot grooves; and
  a plurality of optical fibers accommodated in the slot grooves,
  in which the number of the slot grooves is three or four.

According to this configuration, the slot type optical fiber cable includes the slot rod including the plurality of ribs for forming the slot groove in which the plurality of optical fibers are accommodated, and the number of the slot grooves is three or four. As described above, the number of the slot grooves included in the slot type optical fiber cable having the above configuration is relatively small, and thus and the number of ribs included in the slot rod is also relatively small. Therefore, a space for accommodating the optical fiber in the slot type optical fiber cable having the above configuration is relatively wide, and more optical fibers can be accommodated in the slot rod. Meanwhile, the number of the slot grooves is three or four, and the number of ribs is also three or four, which are larger than 2, and thus bending anisotropy is small. Therefore, according to the slot type optical fiber cable having the above configuration, optical fibers can be mounted at a high density while reducing the bending anisotropy.

(2) In the slot type optical fiber cable according to the above (1), 800 cores or more of the optical fibers may be accommodated in each of the slot grooves.

According to this configuration, the optical fibers can be mounted at a high density.

(3) In the slot type optical fiber cable according to the above (1) or (2), a Young's modulus of a material forming the slot rod may be 0.6 GPa or more and 1.8 GPa or less.

According to this configuration, the number of ribs is three or four, which is relatively small, but the Young's modulus of the material forming the slot rod is 0.6 GPa or more and 1.8 GPa or less, and thus appropriate rigidity as the optical fiber cable can be obtained.

(4) The slot type optical fiber cable according to any one of the above (1) to (3) may further include:
  a tensile strength member arranged at a center of the slot rod; and
  a press wrapping tape wrapped around the slot rod, in which
  when a length in a thickness direction of the rib is a and a length from a portion of the rib in contact with the press wrapping tape to a root of the rib is b, a value of a/b may be 0.1 or more and less than 0.25.

According to this configuration, the rib is thin and has an appropriate mechanical strength, and thus the optical fibers can be mounted at a high density while maintaining a strength.

(5) In the slot type optical fiber cable according to the above (4), in a cross-sectional view, the optical fiber may be arranged in a central portion region and an outer edge portion region, the central portion region being surrounded by a line formed by connecting the ribs and apex portions of adjacent ribs among the plurality of ribs, the outer edge portion region being positioned between the line and the press wrapping tape According to this configuration, the optical fiber is also arranged in the outer edge portion region, and thus the optical fibers can be mounted at a high density according to the slot type optical fiber cable having the above configuration.

(6) The slot type optical fiber cable according to any one of the above (1) to (5), further including:

a subunit in which the plurality of optical fibers are bundled; and a tube member covering the subunit, in which a thickness of the tube member is 0.2 mm or less.

According to this configuration, a plurality of the subunit in which the plurality of optical fibers are bundled are arranged in the slot groove, and a relatively large number of optical fibers are accommodated. Further, the subunit is covered with the tube member having a thickness of 0.2 mm or less. According to the slot type optical fiber cable having the above configuration, it is possible to improve the identity of the optical fiber while mounting the optical fibers at a high density.

(7) In the slot type optical fiber cable according to the above (6), a plurality of the subunits may be arranged in the slot groove, and a water-absorbent fiber may be provided between the plurality of subunits.

According to this configuration, when a liquid such as water enters from a crack or the like generated in a part of the slot type optical fiber cable, the liquid can be prevented from spreading inside the slot type optical fiber cable.

(8) In the slot type optical fiber cable according to the above (6) or (7), the tube member may be formed of a low-density polyethylene or a low-density polyethylene having a flame retardance, and a liquid crystal polymer may be added to the tube member.

According to this configuration, the tube member is formed of a low-density polyethylene or a low-density polyethylene having a flame retardance, and thus the tube member has high heat resistance or high heat resistance and high flame retardance. A liquid crystal polymer having a relatively low linear expansion coefficient is added to the tube member, and thus expansion or contraction of the subunit inside the optical fiber cable can be reduced.

(9) The slot type optical fiber cable according to any one of the above (1) to (8) may further include:

subunits in which the plurality of optical fibers are bundled; and a tape member covering all the subunits included in one of the slot grooves.

According to this configuration, the tape member covers all the subunits included in one slot groove, and thus it is possible to prevent the optical fiber from falling out of the slot groove or being erroneously accommodated in the adjacent slot groove.

(10) In the slot type optical fiber cable according to the above (9), the tape member may contain a water-absorbent powder.

According to this configuration, the tape member contains the water-absorbent powder, and thus even when a liquid such as water enters the slot type optical fiber cable, the liquid can be prevented from spreading inside the cable.

(11) The slot type optical fiber cable according to any one of the above (1) to (10) may further include a press wrapping tape covering the slot rod from outside.

According to this configuration, the press wrapping tape covers the slot rod from the outside, and thus it is possible to prevent the optical fiber from falling out of the slot groove or being erroneously accommodated in the adjacent slot groove.

(12) In the slot type optical fiber cable according to the above (11), the press wrapping tape may include a flame-retardant layer.

According to this configuration, the press wrapping tape includes a flame-retardant layer, and thus a slot type optical fiber cable having a flame retardance can be implemented.

(13) The slot type optical fiber cable according to any one of the above (1) to (12) may further include:

a cable jacket, in which the cable jacket may contain a fiber reinforced plastic.

According to this configuration, the cable jacket included in the slot type optical fiber cable contains the fiber reinforced plastic. The fiber reinforced plastic has a linear expansion coefficient smaller than that of the cable jacket, and thus for example, contraction of the cable jacket at a low temperature can be reduced.

(14) In the slot type optical fiber cable according to any one of the above (1) to (13), an outer diameter of the optical fiber may be 170 μm or more and 200 μm or less.

According to this configuration, the outer diameter of the optical fiber is 170 μm or more and 200 μm or less, and thus the optical fiber is relatively thin, and the optical fiber can be easily mounted at a high-density, and a diameter of the slot type optical fiber cable can be reduced.

Advantageous Effects of Present Disclosure

According to the present disclosure, it is possible to provide a slot type optical fiber cable having high identity and allowing optical fibers to be mounted at a high density while bending anisotropy is reduced.

Details of Embodiments of Present Disclosure

Specific examples of a slot type optical fiber cable according to an embodiment of the present disclosure will be described below with reference to the drawings. The present disclosure is not limited to these exemplifications, but is indicated by the scope of claims, and is intended to include all modifications within a scope and meaning equivalent to the scope of claims.

First Embodiment

A slot type optical fiber cable 1 according to a first embodiment will be described with reference to FIG. 1. FIG. 1 is a cross-sectional view of the slot type optical fiber cable 1.

As illustrated in FIG. 1, the slot type optical fiber cable 1 includes a slot rod 2, a press wrapping tape 3, and a cable jacket 4. An outer diameter of the slot type optical fiber cable 1 is, for example, 24.5 mm. The slot type optical fiber cable 1 has a structure in which a plurality of slot grooves 21 are provided, in a radial shape, in the slot rod 2 including a tensile strength member 23 at a center. The plurality of slot grooves 21 may be provided, in a spiral shape or in a shape twisted in an SZ manner or the like, in a longitudinal direction of the slot type optical fiber cable 1.

The tensile strength member 23 is formed of, for example, a fiber reinforced plastic (FRP). Examples of the fiber reinforced plastic include aramid FRP, glass FRP, and carbon FRP. The tensile strength member 23 may be formed of a liquid crystal polymer. The tensile strength member 23 is preferably non-inductive. The tensile strength member 23 has a circular shape in a cross-sectional view.

Each of the slot grooves 21 accommodates a plurality of optical fiber ribbons 10 rolled from a parallel state and placed in a concentrated state. The press wrapping tape 3 is wrapped around the slot rod 2. The cable jacket 4 is formed around the press wrapping tape 3.

The slot rod 2 is formed of, for example, a resin having a Young's modulus of 0.6 GPa or more and 1.8 GPa or less at room temperature. Such a resin includes, for example, a general-purpose polyethylene and a hard polyethylene. The slot rod 2 includes a plurality of ribs 22 for forming the plurality of slot grooves 21. In the present embodiment, the slot rod 2 includes four ribs 22 (a first rib 221, a second rib 222, a third rib 223, and a fourth rib 224), and the four ribs 22 are regularly arranged, at intervals of 90 degrees, around the tensile strength member 23, for example. Therefore, the slot type optical fiber cable 1 is a four-groove slot type optical fiber cable having four slot grooves 21. For example, 144 optical fiber ribbons 10 are accommodated in each slot groove 21.

Figure 2:
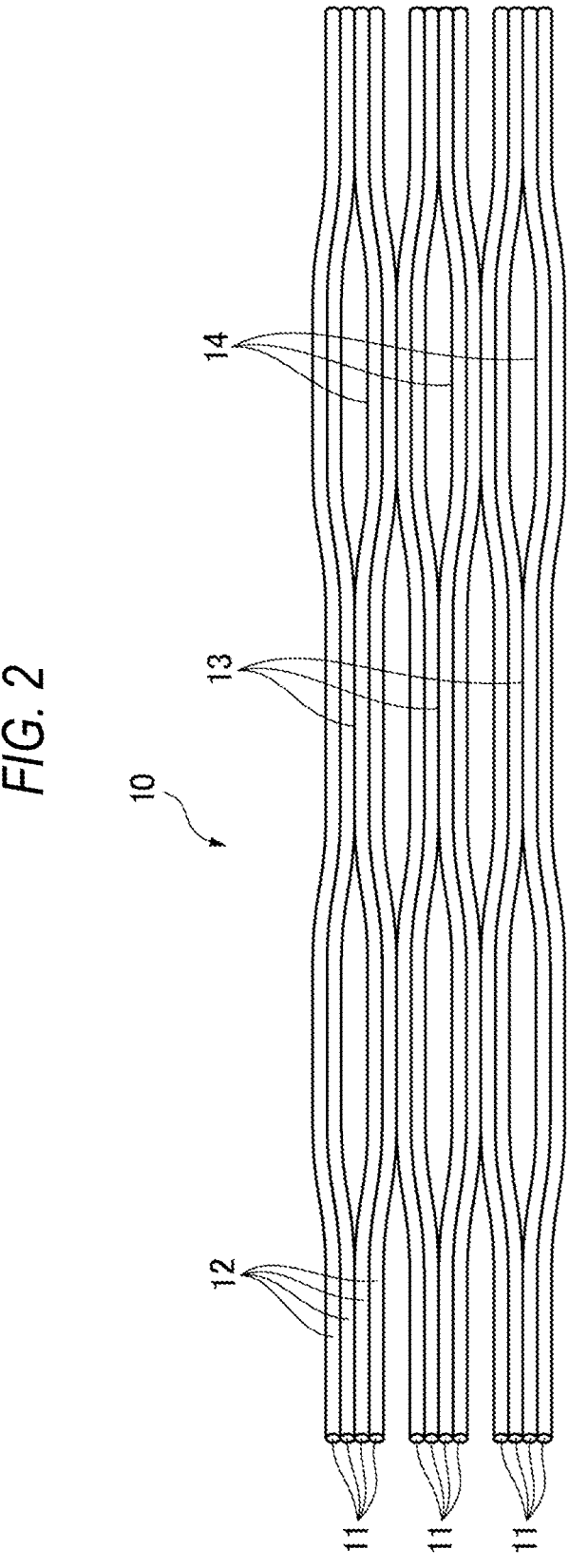
FIG. 2 is a plan view of an optical fiber ribbon included in the slot type optical fiber cable according to the first embodiment.

As illustrated in FIG. 2, the optical fiber ribbon 10 includes a plurality of optical fibers 11. The optical fiber ribbon 10 according to the present embodiment includes, for example, 12 cores of the optical fibers 11. An outer diameter of the optical fiber is, for example, 170 μm or more and 200 μm or less, and thus the optical fiber is relatively thin. The 12 cores of the optical fibers are arranged in parallel in a direction orthogonal to the longitudinal direction. A ribbon resin 12 is formed to cover an outer periphery of the plurality of optical fibers 11 arranged in parallel and is formed to integrate the plurality of optical fibers 11. The ribbon resin 12 is made of a resin such as an ultraviolet-curable resin or a thermosetting resin.

Among at least a part of adjacent optical fibers 11 of the optical fiber ribbon 10, a connecting portion 13 in a state in which the adjacent optical fibers 11 are connected and a non-connecting portion 14 in a state in which the adjacent optical fibers 11 are not connected are intermittently provided in the longitudinal direction of the optical fiber 11. In the present embodiment, the connecting portion 13 and the non-connecting portion 14 are intermittently provided, for every two cores, in the longitudinal direction of the optical fiber 11. The non-connecting portion 14 is formed, for example, by cleaving, with a rotary blade or the like, a part of the ribbon resin 12 for forming the connecting portion 13.

The ribbon resin 12 may be applied only to one surface of the plurality of optical fibers 11 arranged in parallel. The ribbon resin 12 may be formed not only by being applied to the outer periphery of the plurality of optical fibers 11 arranged in parallel, but also may be formed by being applied only between the optical fibers 11. The ribbon resin 12 is applied between the predetermined optical fibers 11, and thus the connecting portion 13 and the non-connecting portion 14 are intermittently provided, and the optical fibers 11 are integrated in parallel.

In the present embodiment, 1728 cores of the optical fibers are accommodated in each slot groove 21. Therefore, the slot type optical fiber cable 1 includes 6912 cores of the optical fibers.

The first rib 221 has apex portions 220A and 220B, the second rib 222 has apex portions 220C and 220D, the third rib 223 has apex portions 220E and 220F, and the fourth rib 224 has apex portions 220G and 220H. The apex portions 220A to 220H are corner portions of the respective ribs 22, and correspond to points where the ribs 22 are in contact the press wrapping tape 3. Here, a region surrounded by lines L1 to L4 formed by connecting the apex portions (the apex portion 220B and the apex portion 220C, the apex portion 220D and the apex portion 220E, the apex portion 220F and the apex portion 220G, and the apex portion 220A and the apex portion 220H) of the adjacent ribs 22 in the circumferential direction among the plurality of ribs 22, and the ribs 22 is referred to as a central portion region CR. A region positioned between the lines L1 to L4 and the press wrapping tape 3 is referred to as an outer edge portion region OR. The optical fiber ribbon 10 is arranged in both the central portion region CR and the outer edge portion region OR. That is, the optical fiber is arranged in both the central portion region CR and the outer edge portion region OR.

As the press wrapping tape 3, for example, a tape formed of polyethylene terephthalate (PET), a tape obtained by laminating a base material such as PET and a nonwoven fabric, or the like may be used. A water absorbent (for example, a water-absorbent powder) may be provided on an inner side of the press wrapping tape 3.

The cable jacket 4 is formed of, for example, a thermoplastic resin such as polyethylene (PE). The cable jacket 4 contains, for example, a silicon-based release agent. The cable jacket 4 is formed by extruding a resin around the slot rod 2 and the plurality of optical fiber ribbons 10 around which the press wrapping tape 3 is wrapped. A thickness of the cable jacket 4 is, for example, 1.2 mm or more and 1.8 mm or less.

Next, examples of the present embodiment will be described. The present disclosure is not limited to the following examples.

By making a shape of the rib 22 (a thickness and a height of the rib 22) different from each other, a temperature characteristic related to the slot type optical fiber cable 1 and whether deformation (also referred to as rib collapse) occurs on the rib 22 provided in the slot type optical fiber cable 1 during manufacturing of the slot rod or at the time of the following mechanical test, are compared.

Table 1 shows a thickness a of the rib 22, a height b of the rib 22, an evaluation related to the temperature characteristic, and presence or absence of the rib collapse. As illustrated in FIG. 1, the thickness a of the rib 22 is a length in a thickness direction of the rib 22 at a position P1 of a root of the rib 22. The position P1 is a boundary between a bottom portion 210 of the slot groove 21 in the rib 22 and a straight portion 211 of the rib, and is a root position of the portion (the straight portion of the rib) 211 that extends linearly or substantially linearly from the bottom portion 210 to a radially outer side. The height b of the rib 22 is a length from a tip position P2 of the rib 22 (a position where the length of the rib 22 is longest) to the position P1. In an evaluation of the temperature characteristic, loss was measured when a temperature cycle of −40° C. or higher and +70° C. or lower was applied in a drum state or in a state in which laying was simulated, and the temperature characteristic was evaluated as "good" (evaluation A) when Aa (a loss variation during the test) was 0.3 dB/km or less, and the temperature characteristic was evaluated as "poor" (evaluation B) in other cases. In an evaluation of the rib collapse, it was evaluated whether the rib collapse occurred during the manufacturing of the slot rod or in an entire test of the mechanical test (a bending test, a lateral pressure test, and an impact test). Regarding the presence or absence of the rib collapse, an evaluation of "good" was given when a rib collapse angle was 10 degrees or less, and an evaluation of "poor" was given when the rib collapse angle was larger than 10 degrees. The rib collapse angle is an angle formed by a central line of the slot rib in an original posture and a central line of the slot rib in a collapsed attitude. In the bending test, the slot type optical fiber cable 1 was wrapped around a mandrel having a diameter of 600 mm while reversing a wrapping direction, and it was measured whether an increase in transmission loss was 0.15 dB or less when the cycle of wrapping and releasing the sample was repeated 10 times. In the lateral pressure test, a pressure of 2,200 N/100 mm was applied to the slot type optical fiber cable 1, and it was measured whether an increase in the transmission loss was 0.15 dB or less when the slot type optical fiber cable 1 was held for 11 minutes. In the impact test, it was measured whether an increase in the transmission loss was 0.15 dB or less when a substantially rectangular parallelepiped weight having a weight of 1.5 kg was dropped from a height of 60 cm toward the slot type optical fiber cable 1.

TABLE 1

|  | Example 1 | Example 2 | Example 3 | Example 4 | Example 5 | Example 6 | Example 7 |
|---|---|---|---|---|---|---|---|
| Thickness a of rib (mm) | 0.8 | 1.0 | 1.5 | 2.0 | 2.5 | 1.0 | 1.5 |
| Height b of rib (mm) | 10 | 10 | 10 | 10 | 10 | 7.0 | 7.0 |
| a/b | 0.08 | 0.10 | 0.15 | 0.20 | 0.25 | 0.14 | 0.21 |
| Temperature characteristic | A | A | A | A | B | A | A |
| Rib collapse | Yes | No | No | No | No | No | No |

First, Examples 1 to 5 will be described. In Examples 1 to 5, the heights b of the ribs 22 are all 10 mm, but the thicknesses a of the ribs 22 are different, and thus the values of a/b are also different. The slot type optical fiber cables 1 according to Examples 1 to 4 were evaluated as A in the test of the temperature characteristic because the increase in the transmission loss was 0.3 dB/km or less. On the other hand, the slot type optical fiber cable 1 according to Example 5 was evaluated as B in the test of the temperature characteristic because the increase in the transmission loss was larger than 0.3 dB/km. In the slot type optical fiber cables 1 according to Examples 2 to 5, the rib collapse did not occur during the manufacturing of the slot rod or at the time of the mechanical test, whereas the rib collapse occurred in the slot type optical fiber cable 1 according to Example 1.

Next, Examples 6 and 7 will be described. In Examples 6 and 7, the heights b of the ribs 22 are all 7 mm, but the thicknesses a of the ribs 22 are different, and thus the values of a/b are also different. The slot type optical fiber cables 1 according to Examples 6 and 7 were evaluated as A in the test of the temperature characteristic because the increase in the transmission loss was 0.3 dB/km or less. Further, in the slot type optical fiber cables according to Examples 6 and 7, the rib collapse did not occur during the manufacturing of the slot rod or at the time of the mechanical test.

From these results, it was confirmed that when the value of a/b was 0.25 or larger, the density of the optical fiber became high, and the temperature characteristic was deteriorated. It was also confirmed that when the value of a/b was smaller than 0.1, a mechanical strength of the slot type optical fiber cable 1 was lowered, and the rib collapse occurred. Therefore, it was confirmed that the slot type optical fiber cable 1 designed in a manner that the value of a/b is 0.1 or larger and smaller than 0.25 has a mechanical strength under which the rib collapse does not occur, and allows the optical fiber to be mounted at a high density.

According to the slot type optical fiber cable 1 as described above, the number of the slot grooves 21 of the slot type optical fiber cable 1 is 4, which is relatively small, and the number of the ribs 22 of the slot rod 2 is also 4, which is relatively small. Therefore, a space for accommodating the optical fiber in the slot type optical fiber cable 1 is relatively wide. Therefore, the slot type optical fiber cable 1 can accommodate more optical fibers in the slot rod 2. Meanwhile, the number of the slot grooves 21 is 4, the number of the ribs is also 4, which are larger than 2, and thus bending anisotropy is small. According to the slot type optical fiber cable 1, the optical fiber can be mounted at a high density while maintaining the strength.

According to the slot type optical fiber cable 1, it is possible to accommodate a relatively large number of 1728 cores of the optical fibers, which is more than 800 cores, in each of the slot grooves 21.

According to the slot type optical fiber cable 1, the number of the ribs 22 is 4, which is relatively small, but the slot rod 2 is formed of a resin having a Young's modulus of 0.6 GPa or more and 1.8 GPa or less at room temperature, and thus appropriate rigidity can be obtained as the optical fiber cable.

According to the slot type optical fiber cable 1, the rib 22 is small in the thickness a and is appropriate in the mechanical strength, and thus the optical fiber can be mounted at a high density while the bending anisotropy is reduced.

According to the slot type optical fiber cable 1, the optical fiber is also arranged in the outer edge portion region OR, and thus the optical fiber can be mounted at a high density.

Second Embodiment

Figure 3:
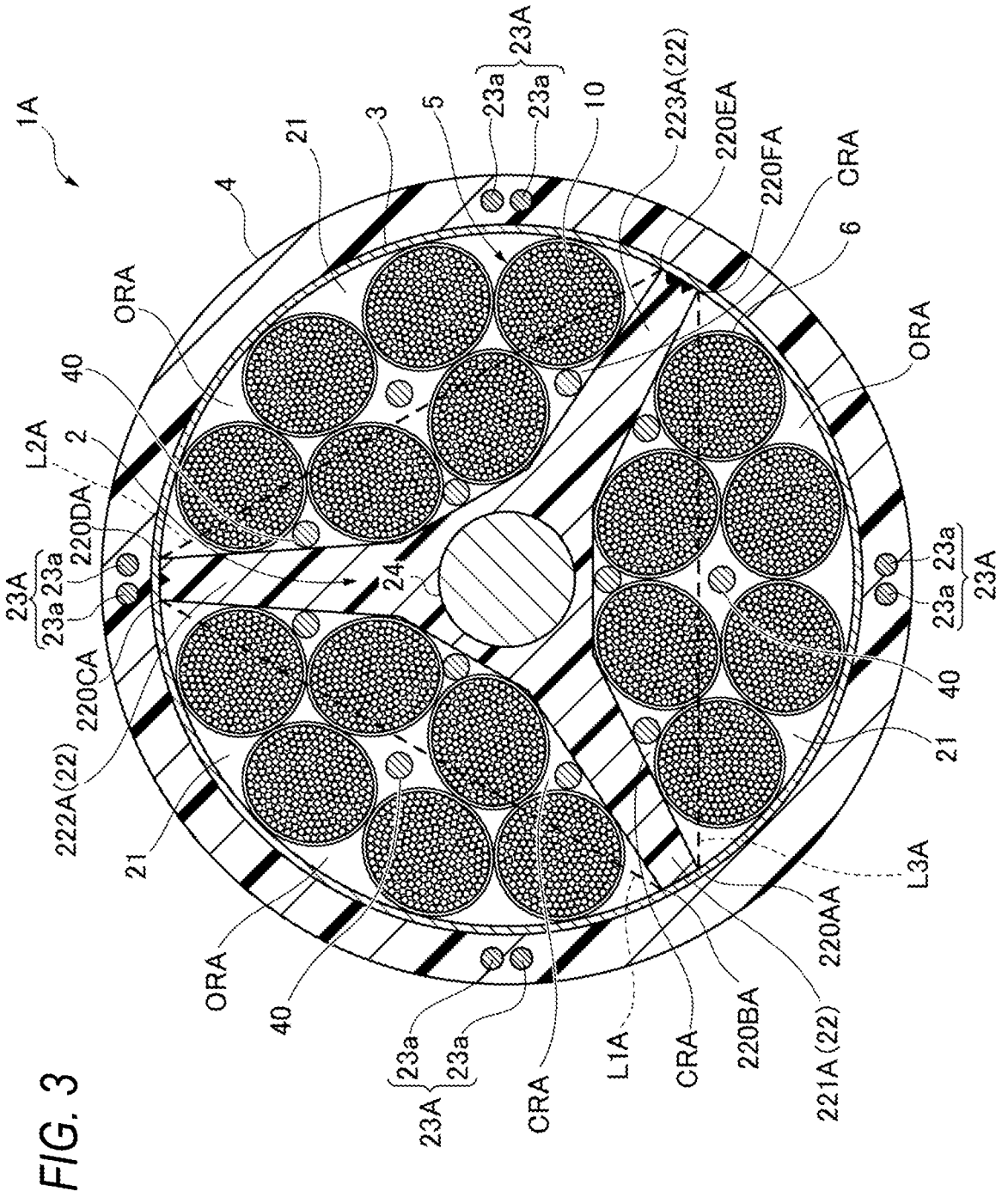
FIG. 3 is a cross-sectional view of a slot type optical fiber cable according to a second embodiment.

A slot type optical fiber cable 1A according to a second embodiment will be described with reference to FIG. 3. FIG. 3 is a cross-sectional view of the slot type optical fiber cable 1A. In the configuration illustrated in FIG. 3, the same components as those illustrated in FIG. 1 are denoted by the same reference numerals, and descriptions thereof are omitted.

As illustrated in FIG. 3, the slot type optical fiber cable 1A includes the slot rod 2, subunits 5, tube members 6, the press wrapping tape 3, and the cable jacket 4. An outer diameter of the slot type optical fiber cable 1A is, for example, 24.5 mm. The slot type optical fiber cable 1A has a structure in which a plurality of the slot grooves 21 are provided, in a radial shape, in the slot rod 2 including a tension member 24 at a center. The plurality of slot grooves 21 may be provided, in a spiral shape or in a shape twisted in an SZ manner or the like, in a longitudinal direction of the slot type optical fiber cable 1A.

In the present embodiment, the slot rod 2 includes three ribs 22 (a first rib 221A, a second rib 222A, and a third rib 223A), and the three ribs 22 are regularly arranged at intervals of 120 degrees around the tension member 24. Therefore, the slot type optical fiber cable 1A is a three-groove slot type optical fiber cable having three slot grooves 21. The plurality of slot grooves 21 are formed by dividing, by the ribs 22, a space inside the slot rod 2. For example, six subunits 5 are accommodated in each slot groove 21.

The first rib 221A has apex portions 220AA and 220BA, the second rib 222A has apex portions 220CA and 220DA, and the third rib 223A has apex portions 220EA and 220FA. The apex portions 220AA to 220FA are corner portions of the respective ribs 22, and correspond to points where the ribs 22 are in contact the press wrapping tape 3. Here, a region surrounded by lines L1A to L3A formed by connecting the apex portions (the apex portion 220BA and the apex portion 220CA, the apex portion 220DA and the apex portion 220EA, the apex portion 220AA and the apex portion 220FA) of the adjacent ribs 22 in a circumferential direction among the plurality of ribs 22, and the ribs 22 is referred to as a central portion region CRA. A region positioned between the lines L1A to L3A and the press wrapping tape 3 is referred to as an outer edge portion region ORA. The optical fiber ribbon 10 is arranged in both the central portion region CRA and the outer edge portion region ORA.

The subunit 5 is formed by bundling a plurality of the optical fiber ribbons 10. In the present embodiment, the subunit 5 includes, for example, 16 optical fiber ribbons 10.

In the optical fiber ribbon 10 according to the present embodiment, for example, 12 cores of the optical fibers 11 are in contact with each other in parallel. That is, each subunit 5 includes 192 cores of the optical fibers 11, and 1152 cores of the optical fibers 11 are accommodated in each slot groove 21. Therefore, the slot type optical fiber cable 1A includes 3456 cores of the optical fibers 11.

As illustrated in FIG. 3, a plurality of water-absorbent fibers 40 are provided between the plurality of subunits 5. In the present embodiment, four water-absorbent fibers 40 are provided in one slot groove 21, but one or more water-absorbent fibers 40 may be provided, and the number of water-absorbent fibers 40 is not limited to four. The water-absorbent fiber 40 is, for example, a fiber obtained by applying a water-absorbent powder to a plastic fiber or a fiber in which water-absorbent properties are maintained. The water-absorbent fiber 40 can absorb, for example, water or the like that enters from a crack or the like generated in a part of the slot type optical fiber cable 1A.

The tube member 6 is arranged to cover the subunit 5. The tube member 6 has a thickness of, for example, 0.05 mm to 0.2 mm. The tube member 6 is made of, for example, a low-density polyethylene or a low-density polyethylene having a flame retardance. The tube member 6 is colored or marked differently, and the subunit 5 is high in identity.

For example, a liquid crystal polymer is added to the tube member 6. The liquid crystal polymer is a liquid crystal having an elongated structure, and has anisotropy. Such a tube member 6 to which the liquid crystal polymer is added is formed into a thin sheet shape by, for example, extrusion molding. A linear expansion coefficient of the liquid crystal polymer is relatively low, and thus the tube member 6 is less likely to expand or contract due to a temperature change.

Inside the cable jacket 4, tensile strength members 23a are embedded along a longitudinal direction of the slot type optical fiber cable 1A. The tensile strength member 23a is made of, for example, a fiber reinforced plastic (FRP), similarly to the tensile strength member 23. In the present embodiment, eight tensile strength members 23a are provided inside the cable jacket 4. Every two of the eight tensile strength members 23a are paired. For example, the paired two tensile strength members 23a are provided in a state of being close to each other or in a state in which at least a part thereof is in contact with each other. In the following description, the paired two tensile strength members 23a are collectively referred to a tensile strength member unit 23A.

In the present embodiment, four tensile strength member units 23A are provided. In a cross-sectional view of the slot type optical fiber cable 1A, the four tensile strength member units 23A are provided in a manner that two pairs of paired two tensile strength member units 23A are provided at positions facing each other across a center of the slot type optical fiber cable 1A. The positions of the four tensile strength member units 23A in the cross-sectional view are positions at which two straight lines obtained by connecting the two pairs of paired two tensile strength member units 23A are orthogonal to each other. The four tensile strength member units 23A are arranged at equal intervals in the circumferential direction of the slot type optical fiber cable 1A, in the cross-sectional view of the slot type optical fiber cable 1A.

According to the slot type optical fiber cable 1A as described above, the number of the slot grooves 21 included in the slot rod 2 of the slot type optical fiber cable 1A is 3, which is relatively small, and thus the number of the ribs 22 included in the slot rod 2 is also relatively small. Therefore, a space for accommodating the optical fiber 11 in the slot type optical fiber cable 1A is relatively wide, and more optical fibers 11 can be accommodated in the slot rod 2. Meanwhile, the number of the slot grooves 21 and the number of the ribs 22 are 3, which are larger than 2, and thus bending anisotropy is small. Further, the optical fiber ribbon 10 is an intermittent connection-type optical fiber ribbon, and thus even when the optical fibers are accommodated at a high density, loss is less likely to increase. Therefore, the three slot grooves 21 can accommodate a large number of 3456 cores of the optical fibers 11 at a high density. Further, the subunit 5 is covered with the tube member 6 having a thickness of 0.05 mm to 0.2 mm, which is relatively thin. Therefore, according to the slot type optical fiber cable 1A, it is possible to improve the identity of the optical fiber while mounting the optical fiber at a high density.

According to the slot type optical fiber cable 1A, the optical fiber 11 is also arranged in the outer edge portion region ORA, and thus the optical fiber can be mounted at a high density.

According to the slot type optical fiber cable 1A, since the plurality of water-absorbent fibers 40 are provided, when a liquid such as water enters from a crack or the like generated in a part of the slot type optical fiber cable 1A, it is possible to prevent the liquid from spreading (water running) in the longitudinal direction of the slot type optical fiber cable 1A in a space formed between the plurality of subunits 5.

According to the slot type optical fiber cable 1A, the tube member 6 is formed of a low-density polyethylene or a low-density polyethylene having a flame retardance, and thus the tube member is high in heat resistance or in the heat resistance and the flame retardance. The liquid crystal polymer having a relatively low linear expansion coefficient is added to the tube member 6, and thus expansion or contraction of the subunit 5 inside the slot type optical fiber cable 1A can be reduced.

According to the slot type optical fiber cable 1A, the cable jacket 4 contains, for example, a fiber reinforced plastic. The fiber reinforced plastic has a linear expansion coefficient smaller than that of the cable jacket 4, and thus for example, contraction of the cable jacket 4 at a low temperature can be prevented.

According to the slot type optical fiber cable 1A, the outer diameter of the optical fiber 11 is 170 μm or more and 200 μm or less, and thus the optical fiber is relatively thin, and the optical fiber can be easily mounted at a high-density, and a diameter of the slot type optical fiber cable 1A can be reduced.

Third Embodiment

Figure 4:
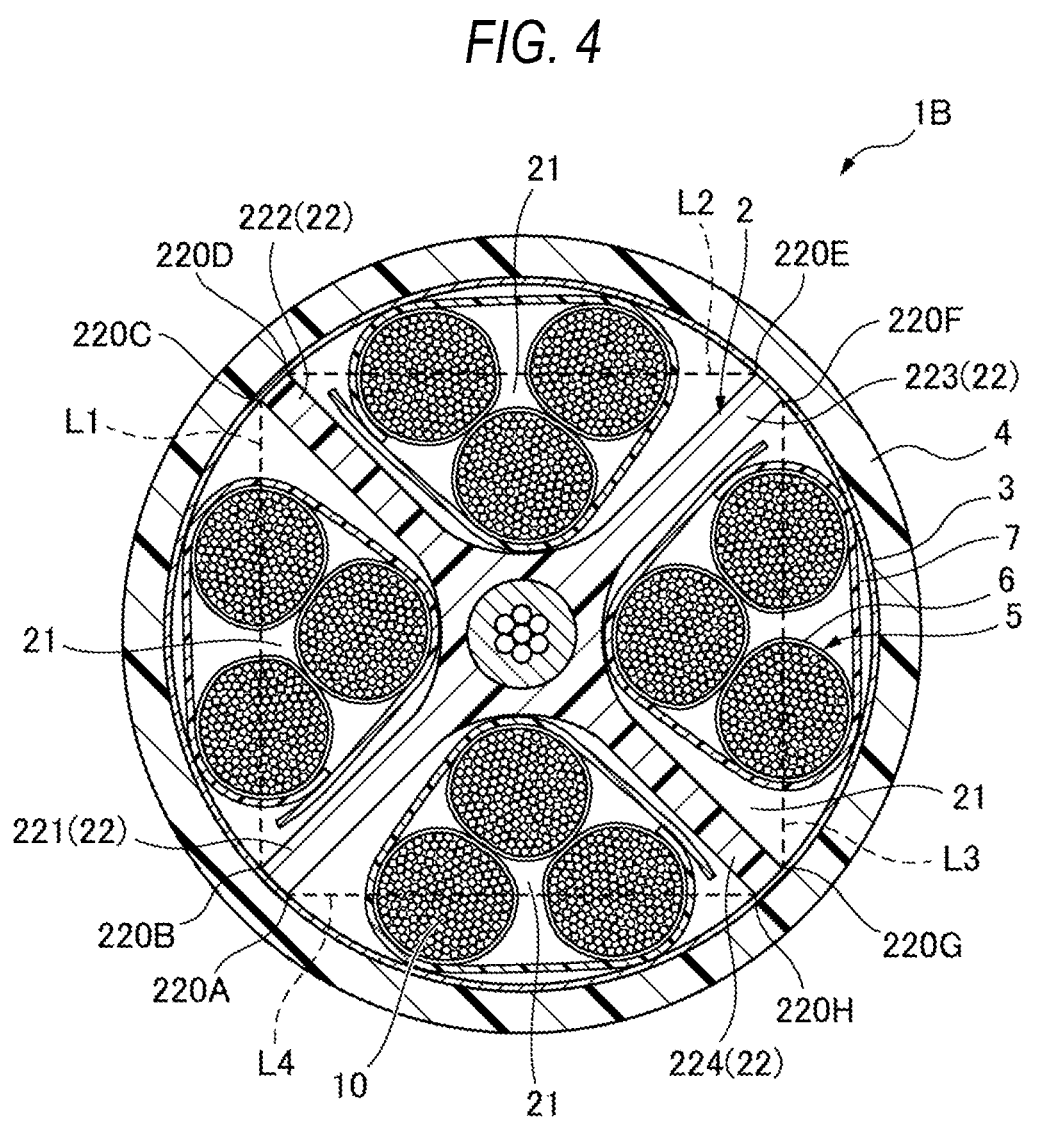

A slot type optical fiber cable 1B according to a third embodiment will be described with reference to FIG. 4. FIG. 4 is a cross-sectional view of the slot type optical fiber cable 1B. In the configuration illustrated in FIG. 4, the same components as those illustrated in FIGS. 1 and 3 are denoted by the same reference numerals, and descriptions thereof are omitted.

As illustrated in FIG. 4, the slot type optical fiber cable 1B includes the slot rod 2, the subunits 5, the tube members 6, tape members 7, the press wrapping tape 3, and the cable jacket 4. An outer diameter of the slot type optical fiber cable 1B is, for example, 24.5 mm. The slot type optical fiber cable 1B has a structure in which a plurality of the slot grooves 21 are provided, in a radial shape, in the slot rod 2 including the tensile strength member 23 at a center.

In the present embodiment, the slot rod 2 includes four ribs 22 (a first rib 221, a second rib 222, a third rib 223, and a fourth rib 224), and the four ribs 22 are regularly arranged, at intervals of 90 degrees, around the tensile strength member 23, for example. Therefore, the slot type optical fiber cable 1B is a four-groove slot type optical fiber cable having four slot grooves 21.

As illustrated in FIG. 4, the slot type optical fiber cable 1B further includes the tape members 7 each covering all the subunits 5 included in one slot groove 21. One tape member 7 is provided in one slot groove 21. The tape member 7 according to the present embodiment is longitudinally wrapped to cover a periphery of the plurality of subunits 5 along a longitudinal direction of the slot type optical fiber cable 1B, but a wrapping method of the tape member 7 is not limited thereto. The tape member 7 may be provided to cover the periphery of the plurality of subunits 5 in a spiral shape in the longitudinal direction of the slot type optical fiber cable 1B. A material for the tape member 7 is, for example, polyester. The tape member 7 is, for example, a nonwoven fabric tape. The tape member 7 may contain a water-absorbent powder.

In the slot type optical fiber cable 1B, the press wrapping tape 3 is provided to cover the slot rod 2 from outside in a state in which the plurality of subunits 5 are covered with the tape member 7 in each slot groove 21. The press wrapping tape 3 according to the present embodiment includes a flame-retardant layer. A material for the press wrapping tape 3 is, for example, polyester. The press wrapping tape 3 is, for example, a nonwoven fabric tape, and both surfaces of the nonwoven fabric tape are coated with flame-retardant polyolefin. The flame-retardant layer is the coating layer formed of the flame-retardant polyolefin. The flame-retardant polyolefin may be coated on one surface instead of both surfaces of the press wrapping tape 3.

According to the slot type optical fiber cable 1B as described above, the tape member 7 covers all the subunits 5 included in each slot groove. Therefore, it is possible to prevent the optical fiber 11 from falling out of the slot groove 21 or being erroneously accommodated in the adjacent slot groove 21.

The tape member 7 contains the water-absorbent powder, and thus even when a liquid such as water enters the inside of the slot type optical fiber cable 1B, it is possible to prevent the liquid from spreading (water running) in the longitudinal direction of the slot type optical fiber cable 1B.

The press wrapping tape 3 covers the slot rod 2 from the outside, and thus it is possible to prevent the optical fiber 11 from falling out of the slot groove 21 or being erroneously accommodated in the adjacent slot groove 21.

The press wrapping tape 3 includes at least one coating layer formed of the flame-retardant polyolefin as the flame-retardant layer, and thus it is possible to implement the slot type optical fiber cable 1B having a flame retardance.

Although the present disclosure has been described in detail and with reference to the specific embodiments, it will be apparent to those skilled in the art that various changes and modifications can be made without departing from the spirit and scope of the present disclosure. In addition, the number, positions, shapes, and the like of the constituent members described above are not limited to those in the above embodiment, and can be changed to suitable numbers, positions, shapes, and the like in carrying out the present disclosure.

In the first embodiment, the slot type optical fiber cable 1 has four slot grooves 21, but may have three slot grooves 21. In the second embodiment, the slot type optical fiber cable 1A has three slot grooves 21, but may have four slot grooves 21.

In the first to third embodiments, the plurality of optical fiber ribbons 10 are accommodated in each slot groove 21, but what is accommodated is not limited to the optical fiber ribbon. A plurality of optical fibers 11 not connected to each other may be accommodated in each slot groove 21.

In the above embodiments, 1728 cores or 1152 cores of the optical fibers are accommodated in each slot groove 21, but the number of cores of the optical fiber accommodated in the slot groove 21 is not limited to 1728 cores or 1152 cores as long as the number of cores of the optical fiber accommodated in the slot groove 21 is 800 cores or more.

In the first embodiment, the rib 22 is partially curved, but the rib 22 may be entirely curved. Even when the rib 22 is entirely curved, the height and the thickness of the rib can be obtained by linearly approximating the rib portion.

In the second embodiment, eight tensile strength members 23a are provided inside the cable jacket 4, but the number of the tensile strength members 23a provided inside the cable jacket 4 is not limited thereto. For example, eight or more tensile strength members 23a may be provided inside the cable jacket 4, or one or more and seven or less tensile strength members 23a may be provided.

In the second embodiment, the four tensile strength member units 23A are arranged at equal intervals in the circumferential direction of the slot type optical fiber cable 1A in a cross-sectional view of the slot type optical fiber cable 1A, but the four tensile strength member units 23A may be arranged at different intervals.

REFERENCE SIGNS LIST 1, 1A, 1B: slot type optical fiber cable
2: slot rod
3: press wrapping tape
4: cable jacket
5: subunit
6: tube member
7: tape member
10: optical fiber ribbon
11: optical fiber
12: ribbon resin
13: connecting portion
14: non-connecting portion
21: slot groove
22: rib
23, 23a: tensile strength member
23A: tensile strength member unit

What is claimed is:

1. A slot type optical fiber cable comprising:
a slot rod including a plurality of ribs for forming a plurality of slot grooves; and
a plurality of optical fibers accommodated in the slot grooves,
wherein the number of the slot grooves is three or four, and
wherein when a length in a thickness direction of the rib is a and a length from a portion of the rib in contact with the press wrapping tape to a root of the rib is b, a value of a/b is 0.1 or more and less than 0.25 so as to both improve a temperature characteristic of the slot type optical fiber cable and prevent rib collapse.

2. The slot type optical fiber cable according to claim 1, wherein 800 cores or more of the optical fibers are accommodated in each of the slot grooves.

3. The slot type optical fiber cable according to claim 1, wherein a Young's modulus of a material forming the slot rod is 0.6 GPa or more and 1.8 GPa or less.

4. The slot type optical fiber cable according to claim 1, further comprising:
a tensile strength member arranged at a center of the slot rod; and
a press wrapping tape wrapped around the slot rod.

5. The slot type optical fiber cable according to claim 4, wherein, in a cross-sectional view, the optical fiber is arranged in a central portion region and an outer edge portion region, the central portion region being surrounded by a line formed by connecting the ribs and apex portions of adjacent ribs among the plurality of ribs, the outer edge portion region being positioned between the line and the press wrapping tape.

6. The slot type optical fiber cable according to claim 1, further comprising:
a subunit in which the plurality of optical fibers are bundled; and
a tube member covering the subunit,
wherein a thickness of the tube member is 0.2 mm or less.

7. The slot type optical fiber cable according to claim 6, wherein a plurality of the subunits are arranged in the slot groove, and
a water-absorbent fiber is provided between the plurality of subunits.

8. The slot type optical fiber cable according to claim 6, wherein the tube member is formed of a low-density polyethylene or a low-density polyethylene having a flame retardance, and
a liquid crystal polymer is added to the tube member.

9. The slot type optical fiber cable according to claim 1, further comprising:
subunits in which the plurality of optical fibers are bundled; and
a tape member covering all the subunits included in one of the slot grooves.

10. The slot type optical fiber cable according to claim 9, wherein the tape member contains a water-absorbent powder.

11. The slot type optical fiber cable according to claim 1, further comprising:
a press wrapping tape covering the slot rod from outside.

12. The slot type optical fiber cable according to claim 11, wherein the press wrapping tape includes a flame-retardant layer.

13. The slot type optical fiber cable according to claim 1, further comprising:
a cable jacket,
wherein the cable jacket contains a fiber reinforced plastic.

14. The slot type optical fiber cable according to claim 1, wherein an outer diameter of the optical fiber is 170 μm or more and 200 μm or less.

* * * * *